Nov. 22, 1938.    C. A. DOENCH    2,137,645

SUPPORTING BRACKET

Filed June 21, 1937

INVENTOR
CLARENCE A. DOENCH
BY
*Walter W. Riedel*
ATTORNEY

Patented Nov. 22, 1938

2,137,645

UNITED STATES PATENT OFFICE 2,137,645

SUPPORTING BRACKET

Clarence A. Doench, Dayton, Ohio

Application June 21, 1937, Serial No. 149,383

4 Claims. (Cl. 248—40)

The present invention relates to improvements in supporting brackets.

Although the present bracket is primarily designed to be used for supporting fishing rods and poles, yet it may just as readily be utilized to hold a garden hose for sprinkling purposes.

It is among the objects of the present invention to provide a foldable bracket which, when unfolded or opened, is adapted to support a fishing rod or a garden hose, and when folded or closed presents a compact structure which may be placed in an ordinary fishing or tackle box or may inconspicuously be stored about the home.

Another object of the present invention is to provide a bracket as mentioned above, of simple and sturdy structure and consisting of a minimum number of parts.

A still further object of the present invention is to provide a bracket adapted to receive a fishing pole and lock it in position against accidental removal, the bracket also being adjustably secured so as to hold the pole in any one of a plurality of angular positions relatively to the bracket.

Further objects and advantages of the present invention will be apparent from the following description, reference being had to the accompanying drawing, wherein a preferred embodiment of one form of the present invention is clearly shown.

Figure 1:
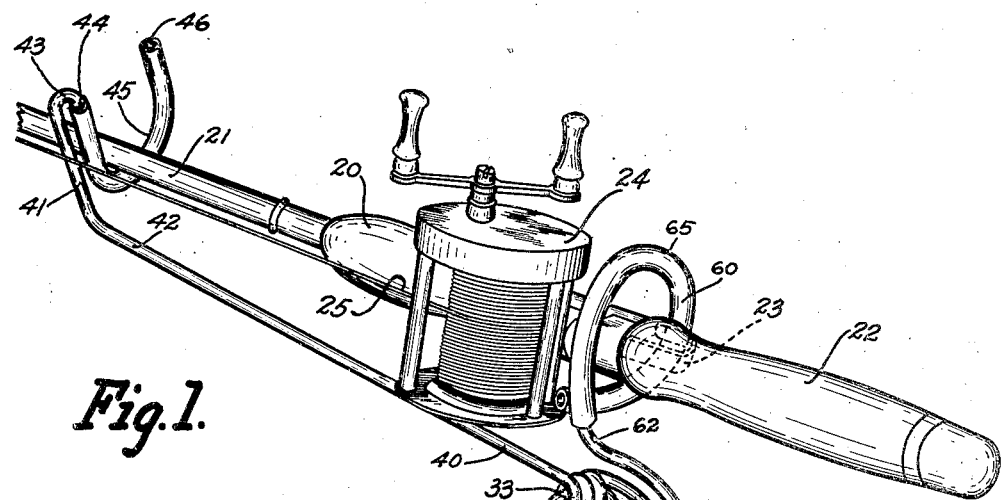
Fig. 1 is a perspective view of the bracket, fully opened or unfolded and having a fishing pole supported thereby.

Referring to the drawing, the pole supported is designated by the numeral 20. It comprises a shaft portion 21 secured to a handle 22 in any well known and practical manner. Adjacent the handle 22 there is provided a finger-grip hook 23, shown in dotted lines. On the side of the pole diametrically opposite this hook 23, the pole has a reel 24 attached thereto, which reel carries the line 25.

The bracket for supporting the above described pole 20 comprises a standard 30, having two, substantially parallel legs 31 and 32 secured together at one end by a bight 33. Applicant had chosen to construct and form his bracket out of metallic rod or wire, and the drawing therefore discloses the standard 30 as of inverted U-shaped construction, the free ends of the legs 31 and 32 being sharpened to permit their easy insertion into the earth.

The supporting bracket comprises an arm 40, shown in the drawing as formed from a single piece of rod or wire. At one end of this arm 40 there is provided a receptacle adapted to receive and support the shaft portion 21 of the fishing pole 20. This receptacle is formed at this end of the arm by providing a portion 41 bent substantially at right angles to the main body 42 of the arm, another semi-circular bend 43 providing a portion 44 substantially parallel to the portion 41. The remaining portion of the end of arm 40, beyond the portion 44 is U-shaped as at 45 to provide the saddle of the receptacle. As shown in the drawing, the U-shaped end of the arm has a rubber tube 46 covering the metal so as to provide a resilient and comparatively soft bed for the shaft of the pole 20.

Figure 2:
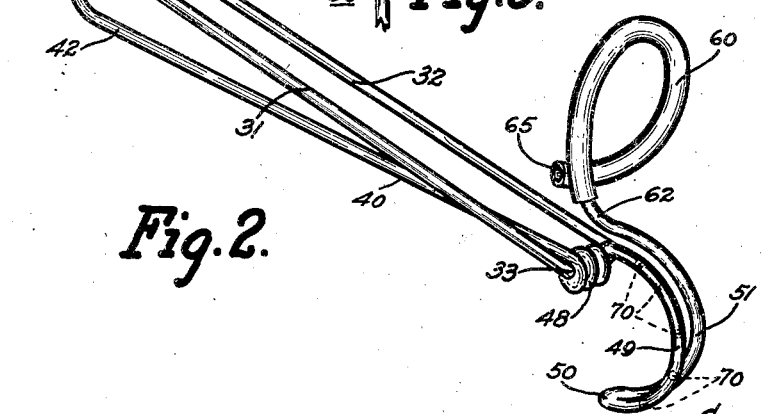
Fig. 2 is a perspective view of the same bracket folded or closed for storage purposes.

At a predetermined spaced distance from the aforedescribed U-shaped end 45 of the arm 40 it has a series of aligned loops or convolutions 48 providing a tube-like passage, the axis of which is substantially at right angles to said arm 40. This tube-like passage is adapted to receive the bight 33 of the standard, thus hingedly or rotatably attaching the arm to said standard. This permits the standard to be rotated in said convolutions so the arm so that its two legs 31 and 32 may enter into the U-shaped receptacle 45 at the end of the arm when the pole supporting bracket is folded or closed as shown in the Fig. 2. The tendency of the legs 31 and 32 to spring outwardly will cause them to engage the upright members of the U-shaped receptacle 45 and securely hold them in this position. To open or unfold the bracket it is necessary only to remove the legs 31 and 32 from the receptacle, rotate them clockwise relatively to the arm 40 as shown in Fig. 2 of the drawing until they assume the position relatively to said arm as is illustrated in Fig. 1.

To definitely establish the proper position of the standard 30 relatively to the arm 40, there is provided a stop which limits the clockwise rotation just described. The rod or wire beyond the convolutions 48 is bent into a circular form as at 49, the greater part of which is substantially concentric to the axis of the bight 33 or to the tube-like channel formed by the convolutions 48. A U-shaped loop 50 is then formed substantially directly beneath the convolutions 48, then a second circular portion 51 is formed corresponding and parallel to but spaced from the portion 49. When the standard 30 is rotated relatively to the arm 40, the leg 32 of the standard passes through the space between these two circularly bent portions 49 and 51 of the arm. The closed loop portion 50 provides the positive fold or stop that properly locates the standard 30 relatively to the arm 40 when the bracket is opened or unfolded for use.

A second receptacle 60, for receiving the pole and holding it on the arm 40, is provided on the arm at its end opposite the U-shaped receptacle 45. This second receptacle, as may be seen in the drawing, is ring-shaped, consisting of a single, helically wound, convolution with provides the opening 61 into said circular formation. A bend in the rod or wire as at 62 places this receptacle substantially at right angles to the main body portion 42 of the arm 40 aligned and substantially parallel with the U-shaped receptacle 45 at the opposite end of said arm. Like said receptacle 45, the portion of the rod or wire forming the circular receptacle 60 is covered with a rubber tube 65.

Figure 3:
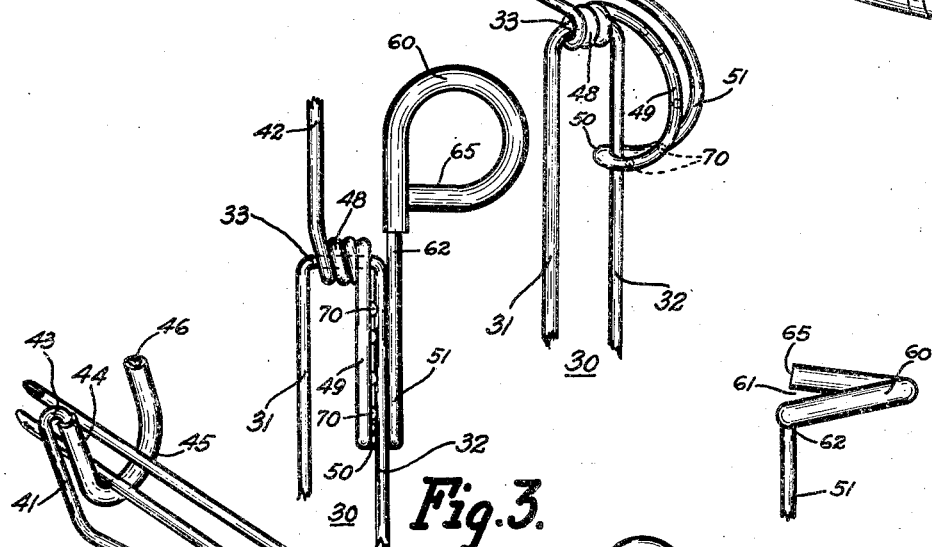
Fig. 3 is a fragmentary end view of a part of the bracket.
Figure 4:
Fig. 4 is a fragmentary top view of the one, helically wound pole receptacle of the bracket.

In order to hold the pole supporting arm 40 securely and adjustably in any one of a plurality of positions so that the angular position of the pole relatively to the ground may be varied at will, there is provided a plurality of humps 70 on the circularly bent portion 49 and lying in the path of movement of the arm 32 of the standard. These humps will hold the arm 40 at any one of a plurality of positions in which the angle between the standard and arm will vary. Naturally indents provided in the surface of the bent portion 49 adjacent leg 32 of the standard will serve the same purpose as the humps in said portion as illustrated in the Fig. 3.

When folded as shown in Fig. 2, the bracket is compact and may readily be placed in the standard size fishing kit or tackle box. To use it one need only to remove the legs 31 and 32 from the U-shaped end or receptacle 45 of the arm 40, rotate the legs 31 and 32 clockwise relatively to the arm 40 as regards the Fig. 2 of the drawing, until the leg 32 of the standard engages the stop 50. This locates the arm substantially at right angles relatively to the standard 30 and in this position the bracket will hold a pole substantially parallel to the water if the legs of the standard are forced into the earth defining the shore line at substantially the vertical.

To have the bracket support a fishing pole provided with a finger-grip hook as shown at 23 in the drawing and a reel, the shaft portion 21 of the pole is placed in the U-shaped receptacle 45. With the reel up and hook 23 down, the end of the handle 22 is inserted into the circularly shaped receptacle 60 until the hook 23 aligns with the end of the loop 60, or more specifically the opening 61 of said circularly shaped receptacle. Then the fishing pole 20 is rotated counter-clockwise as regards Fig. 1, or from the right to the left so that the hook 23 will enter opening 61 and engages the side of the circularly bent portion 60 of the arm 40. This brings the reel to rest upon the main body portion 42 of the arm as shown in Fig. 1, and thus the line 25 will be positioned alongside the part 41 of the arm as shown. The hook 23 engaging portion 60 will lock the pole upon the bracket against accidental removal thereof and it may be seen that a pull upon the line at any angle will not pull the pole from the rear receptacle 60. Rotation of the pole from left to right or clockwise as regards Fig. 1 is necessary to release the pole from the bracket. The position of the reel upon the arm when the pole is locked thereupon places the handles of the reel in easy and proper operating position without necessitating removal of the pole.

If the user wishes to vary the angle of his fishing pole relatively to the water, he needs only to rotate the arm relatively to the standard until the leg 32 of the standard engages a hump 70 which maintains the arm in the desired position.

This bracket is not only adapted to support a fishing pole, but it may also be used to hold a garden hose for sprinkling purposes. The standard may be inserted in the lawn, the arm adjusted to the desirable angle, then the hose inserted in the receptacle 60 while the nozzle is placed in the U-shaped end 45 of the arm.

From the aforegoing it may readily be seen that applicant has provided a simple and useful bracket capable of being folded or closed to require a comparatively small place for storage purposes, as for instance a fishing or tackle box. The construction of the bracket is such as to make it sturdy when opened for use. It is simple and inexpensive inasmuch as it includes only two separate parts each of which is formed from a single piece of rod or wire, and to use it requires no tools such as wrenches or screw drivers.

While the embodiment of the present invention constitutes a preferred form, it is to be understood that other forms might be adopted, all coming within the scope of the claims which follow.

What is claimed is as follows:

1. A fishing pole holder comprising, in combination, a U-shaped standard having two legs secured together at one end by a bight; a one-piece support having a series of convolutions fitting about said bight rotatably to secure the support to the standard and having also a U-shaped bend at one end and a ring-shaped bend at the other end, said bends providing receptacles to receive and hold the fishing pole, and a fold in the support, between the convolutions and ring-shaped bend providing a stop adapted to engage a leg of the standard to hold the support in one position relatively to said standard.

2. A foldable holder for a fishing pole equipped with a reel and finger-grip, comprising, in combination, a U-shaped standard having two substantially parallel legs held together at one end by a bight; a supporting arm consisting of a single piece of metal and having convolutions about the bight rotatably to secure the arm to the standard, the end of the arm more remote from the standard having a U-shaped bend for receiving and supporting the pole when the holder is extended and adapted to receive the legs of the standard when the holder is folded, the end of said arm more adjacent the standard being bent into one open, ring-shaped convolution, helically wound to receive the handle portion of the fishing pole which when rotated in said convolution causes its finger-grip to engage said convolution and lock the pole on the arm and the reel to rest upon it, said single piece arm having a bend between the convolutions about the bight and the spirally wound end convolution for providing a stop adapted to engage a leg of the standard and hold the arm in proper position relatively to said standard.

3. A collapsible rod holder comprising, in combination, a standard having a leg and a bent portion substantially at right angles to said leg; a rod supporting member; a U-shaped portion at one end of said member and integral therewith; an open ring-shaped receptacle at the other end of said member and integral therewith; a series of touching convolutions formed in said member between its ends, and hingedly engaging the bent portion of the standard; and a fold in the supporting member, between the open ring-shaped receptacle and the said touching convolutions, providing a loop adapted to engage the leg of the standard and hold the supporting member in proper unfolded position relatively to the standard.

4. A foldable shaft holder comprising, in combination, a standard; a shaft supporting member; means integral with the supporting member and hingedly engaging the standard rotatably to secure it thereto; a cradle at one end of the supporting member and formed integrally therewith; a spiral loop at the other end of the said member, also formed integrally therewith and substantially, centrally aligned with the cradle; and a fold formed in the supporting member, adapted to engage the standard to hold the said member in a selected position relatively to said standard.

CLARENCE A. DOENCH.